United States Patent
Endo et al.

(10) Patent No.: US 9,071,063 B2
(45) Date of Patent: Jun. 30, 2015

(54) WIRELESS POWER RECEIVING APPARATUS

(75) Inventors: Yuki Endo, Tokyo (JP); Yasuo Furukawa, Tokyo (JP)

(73) Assignee: ADVANTEST CORPORATION, Tokyo (JP)

( * ) Notice: Subject to any disclaimer, the term of this patent is extended or adjusted under 35 U.S.C. 154(b) by 866 days.

(21) Appl. No.: 13/218,295

(22) Filed: Aug. 25, 2011

(65) Prior Publication Data

US 2012/0056486 A1 Mar. 8, 2012

Related U.S. Application Data

(60) Provisional application No. 61/379,692, filed on Sep. 2, 2010.

(51) Int. Cl.
*H01F 27/42* (2006.01)
*H02J 5/00* (2006.01)
*H02J 17/00* (2006.01)

(52) U.S. Cl.
CPC *H02J 5/005* (2013.01); *H02J 17/00* (2013.01)

(58) Field of Classification Search
CPC ............ H02J 5/005; H02J 7/025; H02J 17/00
USPC ........................................................ 307/104
See application file for complete search history.

(56) References Cited

U.S. PATENT DOCUMENTS

| 2010/0148723 A1* | 6/2010 | Cook et al. ..................... 320/108 |
| 2011/0046438 A1* | 2/2011 | Iwaisako ....................... 600/101 |

FOREIGN PATENT DOCUMENTS

| JP | 10-69533 | 3/1998 |
| JP | 2004-72832 | 3/2004 |
| JP | 2007-501600 | 1/2007 |
| JP | 2009-268181 | 11/2009 |
| WO | 2004105208 | 12/2004 |
| WO | WO 2009133795 A1 * | 11/2009 |

OTHER PUBLICATIONS

A. Karalis, J.D. Joannopoulos, M. Soljacic, "Efficient wireless non-radiative mid-range energy transfer", Annals of Physics Apr. 2007, pp. 1-15.
Office action dated Sep. 24, 2014 from corresponding JP Patent Application No. 2011-185938 and its English summary provided by the applicant.

* cited by examiner

*Primary Examiner* — Daniel Cavallari
(74) *Attorney, Agent, or Firm* — Ladas & Parry, LLP (57) ABSTRACT

In a wireless power supply system, a first capacitor is arranged in series with an antenna. A second capacitor and a switch are arranged in series on a path arranged in parallel with the first capacitor. A control unit adjusts the duty ratio of the switch according to the frequency of an electric power signal.

8 Claims, 5 Drawing Sheets

WIRELESS POWER RECEIVING APPARATUS

CROSS-REFERENCE TO RELATED APPLICATIONS

This application claims priority to U.S. Provisional Patent Application No. 61/379,692 filed on Sep. 2, 2010 the disclosure of which is incorporated herein by reference.

BACKGROUND OF THE INVENTION

1. Field of the Invention

The present invention relates to a wireless power supply technique.

2. Description of the Related Art

In recent years, wireless (contactless) power transmission has been receiving attention as a power supply technique for electronic devices such as cellular phone terminals, laptop computers, etc., or for electric vehicles. Wireless power supply transmission can be classified into three principal methods: an electromagnetic induction method, an electromagnetic wave reception method, and an electric field/magnetic field resonance method.

The electromagnetic induction method is employed to supply electric power at a short range (several cm or less), which enables electric power of several hundred watts to be transmitted in a band that is equal to or lower than several hundred kHz. The power use efficiency thereof is on the order of 60% to 98%. In a case in which electric power is to be supplied over a relatively long range of several meters or more, the electromagnetic wave reception method is employed. The electromagnetic wave reception method allows electric power of several watts or less to be transmitted in a band between medium waves and microwaves. However, the power use efficiency thereof is small. The electric field/magnetic field resonance method has been receiving attention as a method for supplying electric power with relatively high efficiency at a middle range on the order of several meters (see Non-patent document 1).

RELATED ART DOCUMENTS

Patent Documents

[Non-Patent Document 1]
A. Karalis, J. D. Joannopoulos, M. Soljacic, "Efficient wireless non-radiative mid-range energy transfer" ANNALS of PHYSICS Vol. 323, January 2008, pp. 34-48.

Figure 1A:
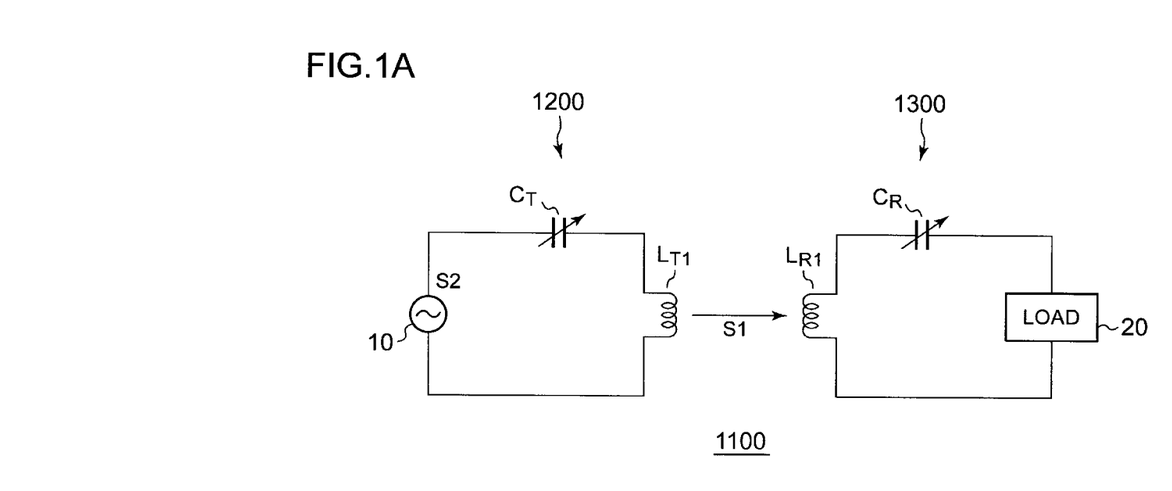
FIG. 1A is a diagram which shows an example of a wireless power supply system.

The Q value is known as an important parameter in electric power transmission using the electric field (magnetic field) resonance method. FIG. 1A is a diagram which shows an example of a wireless power supply system. A wireless power supply system 1100 includes a wireless power supply apparatus 1200 and a wireless power receiving apparatus 1300. The wireless power supply apparatus 1200 includes a transmission coil $L_{T1}$, a resonance capacitor $C_T$, and an AC power supply 10. The AC power supply 10 is configured to generate an electric signal S2 having a transmission frequency $f_1$. The resonance capacitor $C_T$ and the transmission coil $L_{T1}$ form a resonance circuit. The resonance frequency of the resonance circuit thus formed is tuned to the frequency of the electric signal S2. The transmission coil $L_{T1}$ is configured to transmit an electric power signal S1.

The wireless power receiving apparatus 1300 includes a reception coil $L_{R1}$, a resonance capacitor $C_R$, and a load circuit 20. The resonance capacitor $C_R$ and the load circuit 20 form a resonance circuit. The resonance frequency of the resonance circuit thus formed is tuned to the frequency of the electric power signal S1.

Figure 1B:
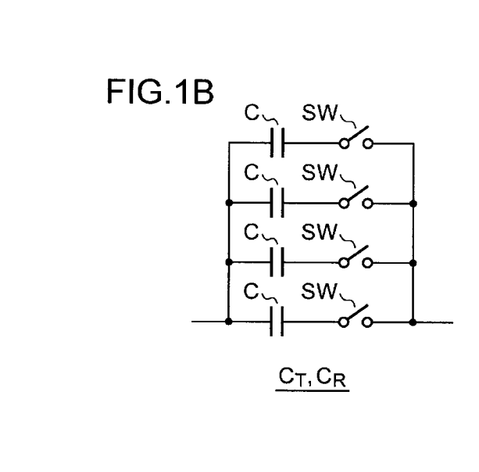
FIG. 1B is a circuit diagram which shows an example configuration of a variable capacitor.

In order to tune the wireless power supply apparatus 1200 and the wireless power receiving apparatus 1300 to the frequency of the electric signal S2, the resonance capacitors $C_T$ and $C_R$ are each configured as a variable capacitor as shown in FIG. 1B.

Such a variable capacitor has multiple capacitors C and multiple switches SW for switching these capacitors. With such a variable capacitor shown in FIG. 1B, as the number of capacitance steps becomes greater, the number of components such as capacitors, switches, etc., also becomes greater, leading to a problem of an increased circuit area and a problem of increased costs.

SUMMARY OF THE INVENTION

The present invention has been made in order to solve such a problem. Accordingly, it is en exemplary purpose of the present invention to provide a wireless power supply system having an advantage of suppressing an increase in the number of circuit components.

An embodiment of the present invention relates to a wireless power receiving apparatus configured to receive an electric power signal including any one of an electric field, a magnetic field, and an electromagnetic field, transmitted from a wireless power supply apparatus. The wireless power receiving apparatus comprises: a reception coil configured to receive the electric power signal; a first capacitor arranged in series with the reception coil; a switch and a second capacitor arranged in series on a path arranged in parallel with the first capacitor; and a control unit configured to control an on/off operation of the switch, with a duty ratio that corresponds to the frequency of the electric power signal.

Another embodiment of the present invention also relates to a wireless power receiving apparatus. The wireless power receiving apparatus comprises: a reception coil configured to receive the electric power signal; an auxiliary coil and a capacitor arranged in series with the reception coil; a switch arranged in parallel with the auxiliary coil; and a control unit configured to control an on/off operation of the switch, with a duty ratio that corresponds to the frequency of the electric power signal.

Yet Another embodiment of the present invention also relates to a wireless power receiving apparatus. The wireless power receiving apparatus comprises: a reception coil configured to receive an electric power signal; a first auxiliary coil and a resonance capacitor arranged in series with the reception coil; a second auxiliary coil configured such that it shares a common core with the first auxiliary coil; a first capacitor and a second capacitor arranged in series such that they and the second auxiliary coil form a closed loop; a switch arranged in parallel with the second capacitor; and a control unit configured to control an on/off operation of the switch, with a duty ratio that corresponds to the frequency of the electric power signal.

Yet Another embodiment of the present invention relates to a wireless power supply apparatus configured to transmit an electric power signal including any one of an electric field, a magnetic field, and an electromagnetic field. The wireless power supply apparatus comprises: a transmission coil configured to transmit the electric power signal; a first capacitor arranged in series with the transmission coil; a switch and a second capacitor arranged in series on a path arranged in parallel with the first capacitor; and a control unit configured to perform an on/off operation of the switch, with a duty ratio that corresponds to the frequency of the electric power signal.

Yet Another embodiment of the present invention also relates to a wireless power supply apparatus. The wireless power supply apparatus comprises: a transmission coil configured to transmit an electric power signal; an auxiliary coil and a capacitor arranged in series with the transmission coil; a switch arranged in parallel with the auxiliary coil; and a control unit configured to control an on/off operation of the switch, with a duty ratio that corresponds to the frequency of the electric power signal.

Yet Another embodiment of the present invention also relates to a wireless power supply apparatus. The wireless power supply apparatus comprises: a transmission coil configured to transmit an electric power signal; a first auxiliary coil and a resonance capacitor arranged in series with the transmission coil; a second auxiliary coil configured such that it shares a common core with the first auxiliary coil; a first capacitor and a second capacitor arranged in series such that they and the second auxiliary coil form a closed loop; a switch arranged in parallel with the second capacitor; and a control unit configured to control an on/off operation of the switch, with a duty ratio that corresponds to the frequency of the electric power signal.

Yet Another embodiment of the present invention relates to a wireless power supply system. The wireless power supply system comprises: a wireless power supply apparatus according to any one of the aforementioned embodiments, configured to transmit an electric power signal including any one of an electric field, a magnetic field, and an electromagnetic field; and a wireless power receiving apparatus according to any one of the aforementioned embodiments, configured to receive the electric power signal.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

First Embodiment

Figure 2:
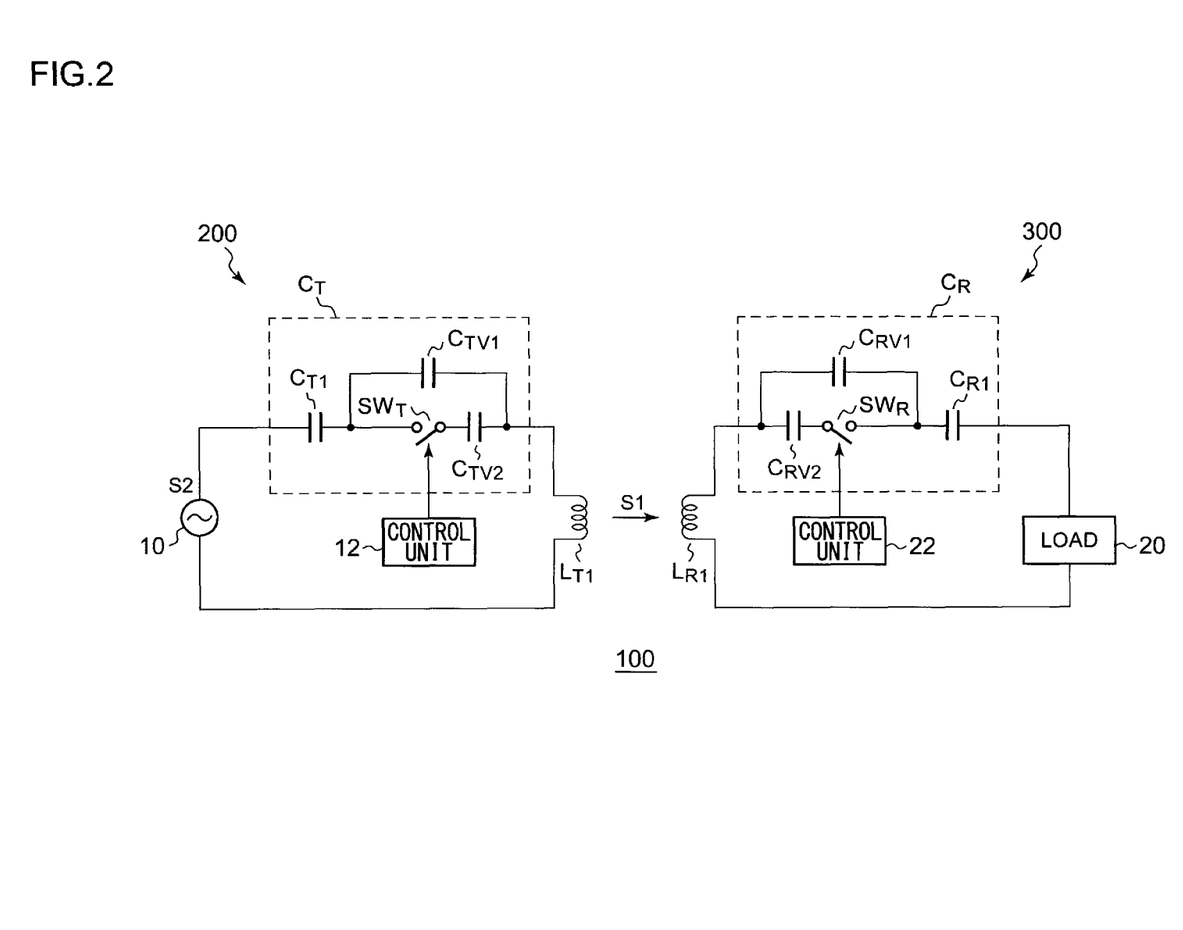
FIG. 2 is a circuit diagram which shows a configuration of a wireless power supply system according to a first embodiment.

FIG. 2 is a circuit diagram which shows a configuration of a wireless power supply system 100 according to a first embodiment. The wireless power supply system 100 includes a wireless power supply apparatus 200 and a wireless power receiving apparatus 300.

The wireless power supply apparatus 200 transmits an electric power signal S1 to the wireless power receiving apparatus 300. As such an electric power signal S1, the wireless power supply system 100 uses the near-field component (electric field, magnetic field, or electromagnetic field) of electromagnetic waves that has not become radio waves.

The wireless power supply apparatus 200 includes an AC power supply 10, a transmission coil $L_{T1}$, a resonance capacitor $C_T$, and a control unit 12. The AC power supply 10 generates an electric signal S2 having a predetermined frequency, or subjected to frequency-modulation, phase-modulation, amplitude-modulation, or the like. For simplicity of description and ease of understanding, description will be made in the present embodiment regarding an arrangement in which the electric signal S2 is an AC signal having a constant frequency. For example, the frequency $f_1$ of the electric signal S2 is selected from a range between several hundred kHz and several MHz.

The transmission coil $L_{T1}$ is an antenna configured to emit the electric signal S2 generated by the AC power supply 10, as a near-field signal (electric power signal) S1 including any one of an electric field, magnetic field, or electromagnetic field.

The resonance capacitor $C_T$ is arranged in series with the transmission coil $L_{T1}$, and is configured to tune the resonance frequency $f_0$ of a resonance circuit that comprises the resonance capacitor $C_T$ and the transmission coil $L_{T1}$ to the transmission frequency $f_1$.

The above is the overall configuration of the wireless power supply apparatus 200. Next, description will be made regarding a configuration of the wireless power receiving apparatus 300. The wireless power receiving apparatus 300 receives the electric power signal S1 transmitted from the wireless power supply apparatus 200. The wireless power receiving apparatus 300 includes a reception coil $L_{R1}$, a resonance capacitor $C_R$, and a load circuit 20. The resonance capacitor $C_R$ and the reception coil $L_{R1}$ form a resonance circuit.

The reception coil $L_{R1}$ receives the electric power signal S1 from the transmission coil $L_{T1}$. An induced current (resonance current) $I_{R1}$ that corresponds to the electric power signal S1 flows through the reception coil $L_{R1}$. The wireless power receiving apparatus 300 retrieves electric power from the induced current. The load circuit 20 is a circuit configured to operate receiving electric power supplied from the wireless power supply apparatus 200. The usage and the configuration of the load circuit 20 is not restricted in particular. The above is the overall configuration of the wireless power receiving apparatus 300.

The resonance capacitor $C_T$ of the wireless power supply apparatus 200 and the resonance capacitor $C_R$ of the wireless power receiving apparatus 300 are each configured as a variable capacitor in order to tune their respective resonance frequencies to the frequency of the electric power signal S1. The resonance capacitors $C_T$ and $C_R$ have the same configuration. Thus, description will be made as an example regarding the resonance capacitor $C_T$ on the transmission side.

The resonance capacitor $C_T$ includes a first capacitor $C_{TV1}$, a second capacitor $C_{TV2}$, a third capacitor $C_T$, and a switch $SW_T$. The first capacitor $C_{TV1}$ is arranged in series with the transmission coil $L_{T1}$. The switch $SW_T$ and the second capacitor $C_{TV2}$ area arranged in series on a path arranged in parallel with the first capacitor $C_{TV1}$. The third capacitor $C_T$ is arranged in series with the transmission coil $L_{T1}$ and the first capacitor $C_{TV1}$.

The control unit 12 controls the on/off operation of the switch $SW_T$ with a duty ratio d that corresponds to the frequency (transmission frequency) $f_1$ of the electric signal S2. The control unit 12 controls the switch $SW_T$ in synchronization with a current $IL_{T1}$ that flows through the transmission coil $L_{T1}$. It is needless to say that the control unit 12 on the transmission side is capable of acquiring the frequency $f_1$ of the electric signal S2.

Figure 3A:
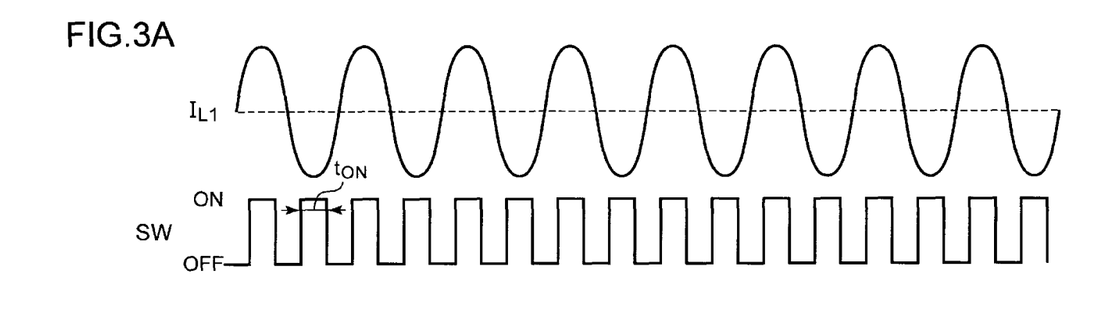
FIGS. 3A and 3B are time charts showing the operation of the wireless power supply apparatus shown in FIG. 2.
Figure 3B:
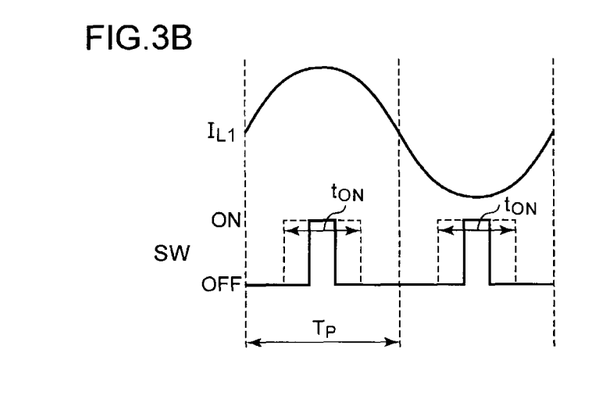

FIGS. 3A and 3B are time charts showing the operation of the wireless power supply apparatus 200 shown in FIG. 2. FIG. 3A shows the current $IL_{T1}$ that flows through the transmission coil $L_{T1}$, and the state of the switch $SW_T$. FIG. 3B shows the state of the switch for each period. As shown in FIG. 3B, the control unit 12 performs a control operation such that the timing at which the amplitude of the current $IL_{T1}$ that flows through the transmission coil $L_{T1}$ becomes its maximum value is included in the on period $T_{ON}$ of the switch $SW_T$. Furthermore, the control unit 12 preferably performs a control operation such that the center of the on period $T_{ON}$ matches the timing at which the amplitude of the current $IL_{T1}$ becomes its maximum value.

The capacitance of the resonance capacitor $C_T$ of the wireless power supply apparatus 200 shown in FIG. 2 is represented by the following Expression (1), using the duty ratio ($d=T_{ON}/T_p$) of the switch $SW_T$.

$$C_T = C_{T1} \cdot (d \cdot C_{TV1} + C_{TV2}) / \{C_{T1} + (d \cdot C_{TV1} + C_{TV2})\} \quad (1)$$

Furthermore, the resonance frequency (tuning frequency) $f_0$ is represented by the following Expression (2).

$$f_0 = 1/\{2\pi\sqrt{(L_{T1} \cdot C_T)}\} \quad (2)$$

By substituting Expression (1) into Expression (2), the resonance frequency $f_0$ is represented by the following Expression (3), using the duty ratio d.

$$f_0 = \frac{1}{2\pi\sqrt{L_{T1} \cdot \frac{C_{T1} \cdot (d \cdot C_{TV1} + C_{TV2})}{C_{T1} + (d \cdot C_{TV1} + C_{TV2})}}} \quad (3)$$

For example, description will be made regarding an arrangement in which $L_{T1}=300$ µH, $C_{T1}=90$ pF, $C_{TV1}=1$ nF, and $C_{TV2}=0.5$ nF. The control unit 12 is capable of adjusting the duty ratio d in a range from 0 to 1. Thus, such an arrangement allows the resonance capacitor $C_T$ to have a variable capacitance in a range from 76.27 to 84.91 pF. Such an arrangement provides a resonance frequency $f_0$ that can be changed in a range between 0.997 MHz and 1.052 MHz.

Such a configuration requires only a single switch $SW_T$ to change the resonance frequency $f_0$ in multiple steps. Thus, such an arrangement provides a reduced number of circuit components, as compared with conventional circuits.

Furthermore, by performing the on/off switching of the switch $SW_T$ as shown in FIG. 3B, such an arrangement suppresses high-frequency components that occur due to the switching operation.

Furthermore, such a configuration shown in FIG. 2 provides a reduced voltage applied to the switch $SW_T$, as compared with a variable capacitor shown in FIG. 1B. Thus, an element having a low breakdown voltage can be employed as such a switch $SW_T$, thereby providing reduced costs.

Also, such an arrangement allows the resonance capacitor $C_R$ included in the wireless power receiving apparatus 300 to have the same advantages as described above. It should be noted that the control unit 22 of the wireless power receiving apparatus 300 may measure the frequency $f_1$ of the electric power signal S1 to determine the duty ratio d. Alternatively, the control unit 22 of the wireless power receiving apparatus 300 may determine the duty ratio d based upon a signal that is a notice of the resonance frequency $f_0$ transmitted from the wireless power supply apparatus 200.

Second Embodiment

Figure 4:
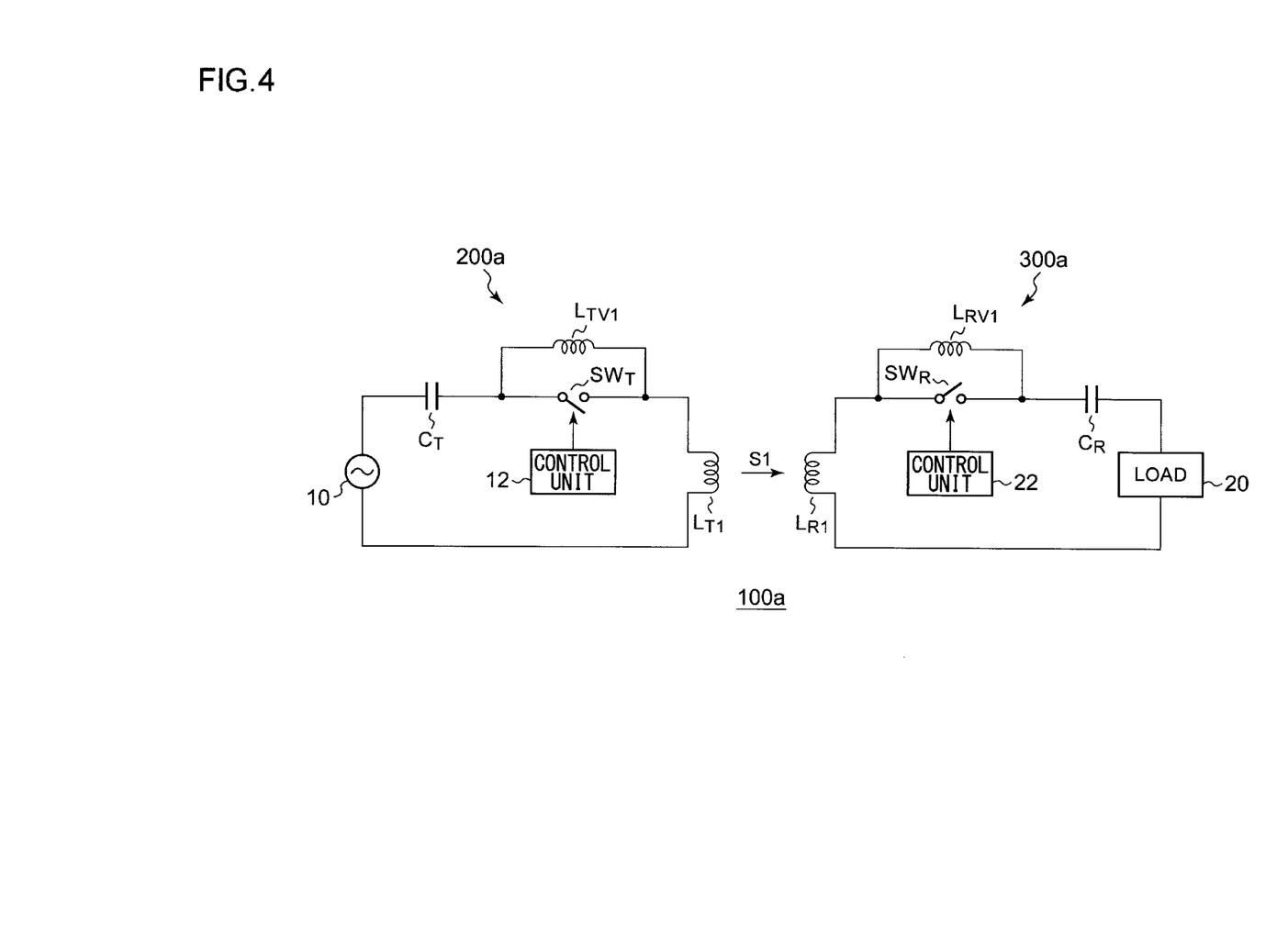
FIG. 4 is a circuit diagram which shows a configuration of a wireless power supply system according to a second embodiment.

FIG. 4 is a circuit diagram which shows a configuration of a wireless power supply system 100a according to a second embodiment.

Description has been made in the first embodiment regarding an arrangement configured to adjust the resonance frequency by changing the capacitance of a resonance circuit. Description will be made in the second embodiment regarding a technique for adjusting the resonance frequency by changing the inductance of a resonance circuit.

A wireless power supply apparatus 200a includes an AC power supply 10, a transmission coil $L_{T1}$, an auxiliary Coil $L_{TV1}$, a switch $SW_T$, a resonance capacitor $C_T$, and a control unit 12.

The auxiliary coil $L_{TV1}$ and the resonance capacitor $C_T$ are arranged in series with the transmission coil $L_{T1}$. The switch $SW_T$ is arranged in parallel with the auxiliary coil $L_{TV1}$. The control unit 12 controls the on/off operation of the switch $SW_T$ with a duty ratio d that corresponds to the frequency $f_1$ of an electric power signal S1.

The wireless power receiving apparatus 300a includes a reception coil $L_{R1}$, an auxiliary coil $L_{RV1}$, a resonance capacitor $C_R$, a switch $SW_R$, a load circuit 20, and a control unit 22.

The auxiliary coil $L_{RV1}$ and the resonance capacitor $C_R$ are arranged in series with the reception coil $L_{R1}$. The switch $SW_R$ is arranged in parallel with the auxiliary coil $L_{RV1}$. The control unit 22 controls the on/off operation of the switch $SW_R$, with a duty ratio d that corresponds to the frequency $f_1$ of the electric power signal S1.

The control operations of the control unit 12 and the control unit 22 for the respective switches $SW_T$ and $SW_R$ are each performed in the same way as shown in FIG. 2.

Directing attention to the wireless power supply apparatus 200a, the inductance of the wireless power supply apparatus 200a is represented by the following Expression (4), using the duty ratio d of the switch $SW_T$.

$$L = d \cdot L_{TV1} + L_{T1} \quad (4)$$

Thus, the resonance frequency $f_0$ is represented by the following Expression (5).

$$f_0 = 1/\{2\pi\sqrt{((d \cdot L_{TV1} + L_{T1}) \cdot C_T)}\} \quad (5)$$

The same can be said of the wireless power receiving apparatus 300a.

As described above, with the wireless power supply system 100a shown in FIG. 4, the resonance capacitance can be adjusted in multiple steps according to the duty ratios of the switches $SW_T$ and $SW_R$. Thus, such an arrangement provides a reduced number of circuit components. Furthermore, such an arrangement allows a switch with a low breakdown voltage to be employed, like the wireless power supply system 100 shown in FIG. 2.

Third Embodiment

Figure 5:
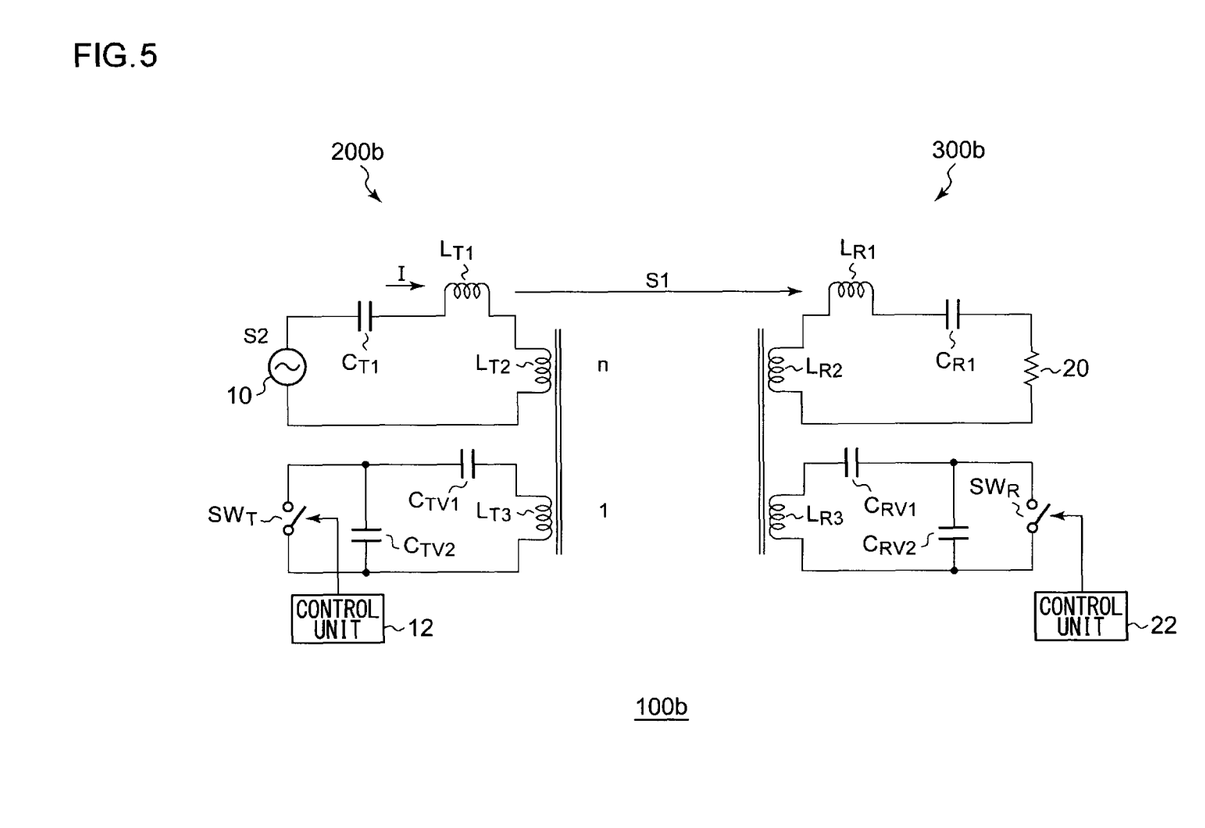
FIG. 5 is a circuit diagram which shows a configuration of a wireless power supply system according to a third embodiment.

FIG. 5 is a circuit diagram which shows a configuration of a wireless power supply system 100b according to a third embodiment.

A wireless power supply apparatus 200b includes an AC power supply 10, a resonance capacitor $C_{T1}$, a transmission coil $L_{T1}$, a first auxiliary coil $L_{T2}$, a second auxiliary coil $L_{T3}$, a first capacitor $C_{TV1}$, a second capacitor $C_{TV2}$, a switch $SW_T$, and a control unit 12.

The first auxiliary coil $L_{T2}$ and the resonance capacitor $C_{T1}$ are arranged in series with the transmission coil $L_{T1}$. The second auxiliary coil $L_{T3}$ and the first auxiliary coil $L_{T2}$ share a common core, and are configured such that the winding ratio between the second and first auxiliary coils is n:1. The first capacitor $C_{TV1}$ and the second capacitor $C_{TV2}$ are arranged in series such that they and the second auxiliary coil $L_{T3}$ form a closed loop. The switch $SW_T$ is arranged in parallel with the second capacitor $C_{TV2}$. The control unit 12 controls the switch $SW_T$.

The resonance circuit of the wireless power receiving apparatus 300b is configured in the same way as the resonance circuit of the wireless power supply apparatus 200b.

With the wireless power supply apparatus 200b shown in FIG. 5, the capacitance C of the resonance circuit is represented by the following Expression (6).

$$C = \frac{C_{T1} \cdot \left(\frac{1-n}{n^2} C_{TV1} + \frac{\frac{C_{TV1}}{n} \cdot d\left(C_{TV2} + \frac{n-1}{n} C_{TV1}\right)}{\frac{C_{TV1}}{n} + d\left(C_{TV2} + \frac{n-1}{n} C_{TV1}\right)}\right)}{C_{T1} + \left(\frac{1-n}{n^2} C_{TV1} + \frac{\frac{C_{TV1}}{n} \cdot d\left(C_{TV2} + \frac{n-1}{n} C_{TV1}\right)}{\frac{C_{TV1}}{n} + d\left(C_{TV2} + \frac{n-1}{n} C_{TV1}\right)}\right)} \quad (6)$$

With the wireless power supply apparatus 200b shown in FIG. 5, the capacitance C, i.e., the resonance frequency, can be adjusted according to the duty ratio d of the switch $SW_T$. Furthermore, such an arrangement uses transformer conversion by means of the first auxiliary coil $L_{T2}$ and the second auxiliary coil $L_{T3}$. Thus, such an arrangement provides a reduced voltage applied to the switch $SW_T$. Thus, such an arrangement allows a switch with a low breakdown voltage to be employed.

Description has been made regarding the present invention with reference to the embodiments. The above-described embodiments have been described for exemplary purposes only, and are by no means intended to be interpreted restrictively. Rather, various modifications may be made by making various combinations of the aforementioned components or processes. Description will be made below regarding such modifications.

Description has been made in the embodiments regarding an arrangement in which the wireless power supply apparatus 200 and the wireless power receiving apparatus 300 that are components of the wireless power supply system 100 have the same topology. However, the present invention is not restricted to such an arrangement. That is to say, a wireless power supply apparatus according to a desired one of the aforementioned embodiments may be combined with a wireless power receiving apparatus according to a different one of the aforementioned embodiments. Also, a wireless power supply apparatus according to a desired one of the aforementioned embodiments may be combined with a different wireless power receiving apparatus that is not described in the present specification. In the same way, a wireless power receiving apparatus according to a desired one of the aforementioned embodiments may be combined with a wireless power supply apparatus according to a different one of the aforementioned embodiments. Also, a wireless power receiving apparatus according to a desired one of the aforementioned embodiments may be combined with a different wireless power supply apparatus that is not described in the present specification.

In FIG. 2, the third capacitor $C_{T1}$ and the third capacitor $C_{R1}$ may be omitted.

While the preferred embodiments of the present invention have been described using specific terms, such description is for illustrative purposes only, and it is to be understood that changes and variations may be made without departing from the spirit or scope of the appended claims.

What is claimed is:

1. A wireless power receiving apparatus configured to receive an electric power signal including any one of an electric field, a magnetic field, and an electromagnetic field, transmitted from a wireless power supply apparatus, the wireless power receiving apparatus comprising:
   a reception coil configured to receive the electric power signal;
   an auxiliary coil and a capacitor arranged in series with the reception coil;
   a switch arranged in parallel with the auxiliary coil; and
   a control circuit for controlling an ON/OFF operation of the switch with a duty ratio that corresponds to the frequency of the electric power signal.

2. A wireless power receiving apparatus according to claim 1, wherein the control circuit controls the switch in synchronization with a current that flows through the reception coil.

3. A wireless power receiving apparatus according to claim 1, wherein the control circuit controls the switch such that the amplitude of a current that flows through the reception coil becomes its maximum value in an ON period of the switch.

4. A wireless power supply system comprising:
   a wireless power supply apparatus configured to transmit an electric power signal including any one of an electric field, a magnetic field, and an electromagnetic field; and
   a wireless power receiving apparatus according to claim 1, configured to receive the electric power signal.

5. A wireless power supply apparatus configured to transmit an electric power signal including any one of an electric field, a magnetic field, and an electromagnetic field, the wireless power supply apparatus comprising:
   a transmission coil configured to transmit the electric power signal; an auxiliary coil and a capacitor arranged in series with the transmission coil;
   a switch arranged in parallel with the auxiliary coil; and a control circuit for controlling an ON/OFF operation of the switch with a duty ratio that corresponds to the frequency of the electric power signal.

6. A wireless power supply apparatus according to claim 5, wherein the control circuit controls the switch in synchronization with a current that flows through the transmission coil.

7. A wireless power supply apparatus according to claim 5, wherein the control circuit controls the switch such that the amplitude of a current that flows through the transmission coil becomes its maximum value in an ON period of the switch.

8. A wireless power supply system comprising:
a wireless power supply apparatus according to claim 5, configured to transmit an electric power signal including any one of an electric field, a magnetic field, and an electromagnetic field; and
a wireless power receiving apparatus configured to receive the electric power signal.

\* \* \* \* \*